US010652605B2

(12) United States Patent
Tobin (10) Patent No.: US 10,652,605 B2
(45) Date of Patent: *May 12, 2020

(54) VISUAL HOT WATCH SPOTS IN CONTENT ITEM PLAYBACK

(71) Applicant: Google LLC, Mountain View, CA (US)

(72) Inventor: Perry Tobin, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,799

(22) Filed: Apr. 13, 2018

(65) Prior Publication Data

US 2018/0234717 A1 Aug. 16, 2018

Related U.S. Application Data

(63) Continuation of application No. 14/042,371, filed on Sep. 30, 2013, now Pat. No. 9,979,995.

(51) Int. Cl.
H04N 21/2743 (2011.01)
G06F 16/48 (2019.01)
H04N 21/442 (2011.01)
H04N 21/472 (2011.01)
H04N 21/475 (2011.01)
(Continued)

(52) U.S. Cl.
CPC ......... *H04N 21/2743* (2013.01); *G06F 16/48* (2019.01); *H04N 21/44222* (2013.01); *H04N 21/4756* (2013.01); *H04N 21/4788* (2013.01); *H04N 21/47217* (2013.01); *H04N 21/8456* (2013.01)

(58) Field of Classification Search
None
See application file for complete search history.

(56) References Cited

U.S. PATENT DOCUMENTS 7,031,931 B1 * 4/2006 Meyers .............. G06Q 30/0203
  348/E5.096
9,591,050 B1 * 3/2017 Sherrets ................. H04L 67/02
(Continued)

OTHER PUBLICATIONS

MediaCollege, visual_display_gradual_color_variance_basedon_score_MediaCollege_02072005, Feb. 7, 2005.
(Continued)

*Primary Examiner* — Amresh Singh
(74) *Attorney, Agent, or Firm* — Lowenstein Sandler LLP (57) ABSTRACT

A method for providing visual hot watch spots in content item playback on a content sharing platform is disclosed. The method includes obtaining viewer feedback comprising input associated with a time interval segment of a content item of a content sharing platform, the viewer feedback received from user devices of users of the content sharing platform, determining a score for the time interval segment based on the viewer feedback, modifying a portion of a scrub bar user interface element of a media player presenting the content item by providing a visual indication of the score for the time interval segment corresponding to the portion, and providing a gradual transition between colors at one or more boundaries of the time interval segment, and updating the score and modifying the portion responsive to new viewer feedback received for the time interval segment during playback of the content item.

20 Claims, 7 Drawing Sheets (51) Int. Cl.
*H04N 21/4788* (2011.01)
*H04N 21/845* (2011.01)

(56) References Cited

U.S. PATENT DOCUMENTS

| | | | |
|---|---|---|---|
| 2006/0109278 | A1 | 5/2006 | Bixler et al. |
| 2007/0043761 | A1 | 2/2007 | Chim et al. |
| 2009/0018917 | A1 | 1/2009 | Chapman et al. |
| 2011/0161820 | A1 | 6/2011 | Lee |
| 2011/0205043 | A1 | 8/2011 | Fujiki et al. |
| 2012/0110621 | A1 | 5/2012 | Gossweiler, III |
| 2012/0237183 | A1 | 9/2012 | Chen et al. |
| 2013/0091299 | A1 | 4/2013 | Wei et al. |
| 2013/0145269 | A1 | 6/2013 | Latulipe et al. |
| 2013/0334300 | A1 | 12/2013 | Evans |
| 2014/0101551 | A1 | 4/2014 | Sherrets et al. |

OTHER PUBLICATIONS

Romain Dillet, "YouTube Founders Introduce MixBit to Crack the Code of Video Editing on Mobile," Aug. 8, 2013, 4 pages.

International Search Report for and Written Opinion of the International Searching Authority for International Patent Application No. PCT/US2014/056395, dated Dec. 31, 2014, 7 pages.

USPTO, Office Action for U.S. Appl. No. 14/042,371, dated Jul. 17, 2015.

USPTO, Final Office Action for U.S. Appl. No. 14/042,371, dated Feb. 11, 2016.

USPTO, Office Action for U.S. Appl. No. 14/042,371, dated Mar. 24, 2016.

USPTO, Final Office Action for U.S. Appl. No. 14/042,371, dated Sep. 14, 2016.

USPTO, Final Office Action for U.S. Appl. No. 14/042,371, dated Nov. 10, 2016.

USPTO, Office Action for U.S. Appl. No. 14/042,371, dated Jan. 24, 2017.

USPTO, Final Office Action for U.S. Appl. No. 14/042,371, dated Jul. 10, 2017.

USPTO, Office Action for U.S. Appl. No. 14/042,371, dated Nov. 28, 2017.

USPTO, Advisory Action for U.S. Appl. No. 14/042,371, dated Sep. 15, 2017.

USPTO, Notice of Allowance for U.S. Appl. No. 14/042,371, dated Jan. 26, 2018.

USPTO, Notice of Allowance for U.S. Appl. No. 14/042,371, dated Feb. 20, 2018.

\* cited by examiner

```
┌─────────────────────────────────────────────────────────────────┐
│ Determine that a content owner configures a content item to    │
│ enable a "hot-watch" feature                                    │
│                                                            310  │
└─────────────────────────────────────────────────────────────────┘
                              │
                              ▼
┌─────────────────────────────────────────────────────────────────┐
│ Divide content item into segments                               │
│                                                            320  │
└─────────────────────────────────────────────────────────────────┘
                              │
                              ▼
┌─────────────────────────────────────────────────────────────────┐
│ For each segment of the content item, calculate a score for the │
│ segment based on multiple signals associated with the segment   │
│                                                            330  │
└─────────────────────────────────────────────────────────────────┘
                              │
                              ▼
┌─────────────────────────────────────────────────────────────────┐
│ For each segment of the content item, assign an intensity       │
│ indicator to the segment based on the calculated score of the   │
│ segment                                                         │
│                                                            340  │
└─────────────────────────────────────────────────────────────────┘
                              │
                              ▼
┌─────────────────────────────────────────────────────────────────┐
│ Modify scrub bar of media player providing playback of the      │
│ content item to display the intensity indicators corresponding  │
│ to the segments of the content item                             │
│                                                            350  │
└─────────────────────────────────────────────────────────────────┘
                              │
                              ▼
                          ( END )
```

VISUAL HOT WATCH SPOTS IN CONTENT ITEM PLAYBACK

RELATED APPLICATION

This application is a continuation of and claims the benefit under 35 U.S.C. § 120 of U.S. patent application Ser. No. 14/042,371, filed on Sep. 30, 2013, titled "Visual Hot Watch Spots in Content Item Playback", the entirety of which is incorporated herein by reference.

TECHNICAL FIELD

This disclosure relates to the field of content sharing platforms and, in particular, to providing visual hot watch spots in content item playback.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, when a user is viewing a content item of the content sharing platform, the user is not aware of "hot watch" spots (e.g., popular or interesting segments) within the content item. Scrub bars (e.g., media player bar showing a timeline of the content item and a user's position in the playback of the content item) in media players provided by content sharing platforms typically only show a time line of the content time and do not provide visual clues to indicate the "hot watch" spots (e.g., key plays, momentum swings, close calls, or the general best parts) of the content item to watch.

Users of content sharing platforms may rewind and search for parts of a content item using the scrub bar. However, users generally do not have any indication as to whether a popular or interesting segment is ahead of or behind a current position of the user in the playback of the content item. It is often difficult to search for the key parts of a content item using the scrub bar. In addition, it often takes time to load a content item for playback in the media player, which leaves the user frustrated and thereby less frequently (or even never) using it.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing visual hot watch spots in content item playback is disclosed. The method includes separating, by a processing device of a content sharing platform, a duration of a content item into time interval segments. The method further includes, for each of the time interval segments, determining a score for the time interval segment in view of one or more signals indicating a popularity of the time interval segment to users viewing the content item on the content sharing platform, and providing a visual indication of the score for the time interval segment of the content item in a user interface presenting the content item.

In one implementation, the visual indication may be provided on a portion of a scrub bar of a media player, the portion corresponding to the time interval segment. In addition, each time interval segment comprises a predetermined number of video frames. Furthermore, the number of video frames in a time interval segment may be determined by the duration of the content item divided by a predetermined number of time interval segments.

In some implementations, the visual indication is part of a color scheme, and wherein colors at boundaries of consecutive time interval segments are blended together to create a gradual transition between colors at the consecutive time interval segment. The time interval segments may then comprise a score above a highest score threshold are shown as white on the scrub bar and the time interval segments comprising a score below a lowest score threshold are shown with no color on the scrub bar.

In one implementation, the one or more signals may comprise at least one of an editorial weight assigned by a user owning the content time to the time interval segment, a frequency of discussion regarding content of the time interval segment on one or more social networks, indications of votes from users of the content sharing platform for the time interval segment, or a viewing weight based on number of views by users of the content sharing platform of the time interval segment.

In another implementation, a user of the content sharing platform that curates the content item may determine a number of time interval segments for the content item. In addition, the determining and providing of the method may be performed during real-time playback of the content item when the content item is a live event.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for providing visual hot watch spots in content item playback. In implementations of the disclosure, a scrub bar of a media player of the content sharing platform may be modified to display visual indications of "hot watch" areas of the content item. The scrub bar is an indicator in the media player that allows a user to go back and forth in time within a content item playing on the media player. In implementations of the disclosure, intensity indicators (e.g., different colors) are shown on a scrub bar of the media player to provide a user with a visual indication that there is something important and/or interesting (e.g., a "hot watch" area) occurring at that portion of the content item playing back on the media player. For example, in the context of a sporting event, a video of the sporting event may include a scrub bar with "hot watch" spots indicating key plays, momentum swings, close calls, and so on.

Implementations of the disclosure have a different layer of granularity than previous solutions for marking scrub bars for a content item. Previously, many media players have used the concept of chapter markers that highlight a location in the content item. These markers are single points in time. The previous solutions usually did not take into account multiple signals (such as live feedback from users, editorial input, social media feedback, and so on) to determine and indicate intensity over a period of time in the content item. By implementing methods for providing visual hot watch spots in content item playback on a content sharing platform according to the present disclosure, the media player for a content item can provide visual cues for a user to rewind to and playback, thus directing viewers to the "best" or "most interesting" portions of the content item and thereby increasing user enjoyment and encouraging more watch time to the benefit of the content sharing platform.

Figure 1:
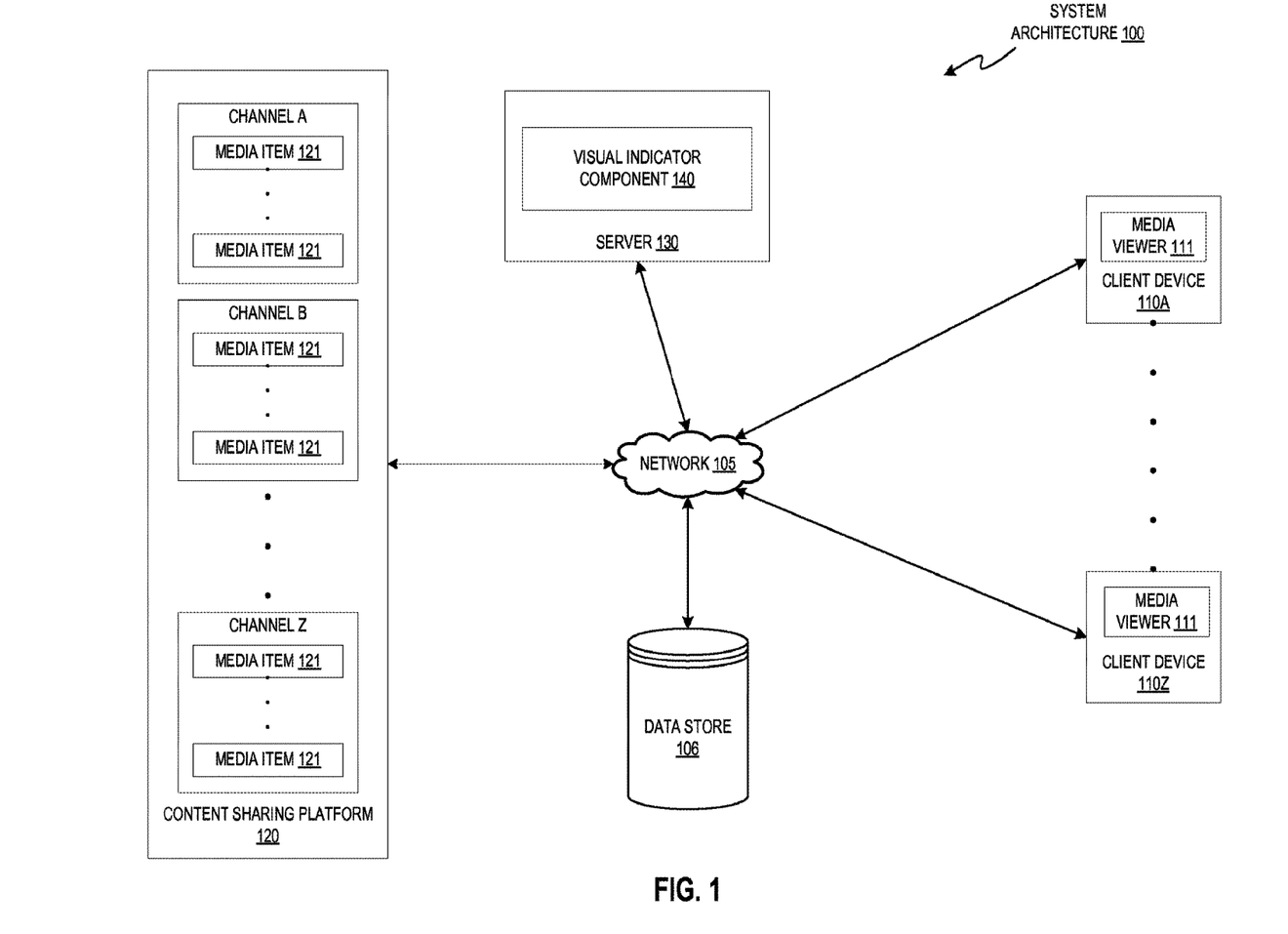
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a visual indicator component 140. The visual indicator component 140 modifies a scrub bar of a media player of the content sharing platform. The scrub bar is an indicator in the media player that allows a user to go back and forth in time within a content item playing on the media player.

More specifically, in implementations of the disclosure, the visual indicator component 140 modifies a scrub bar of a media player of the content sharing platform with intensity indicators to give the user a visual indication that there is something important and/or interesting (e.g., a "hot watch" area) of the content item playing back on the media player. For example, in the context of a sporting event, a video of the sporting event may include a scrub bar with "hot watch" spots indicating key plays, momentum swings, close calls, and so on. In other implementations, the scrub bar is not modified, and a different indicator of "hot watch" spots is provided, such as a graph separate from the scrub bar or other visual indicator. In further implementations, the graph is provided in addition to the scrub bar modifications. Further description of the visual indicator component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
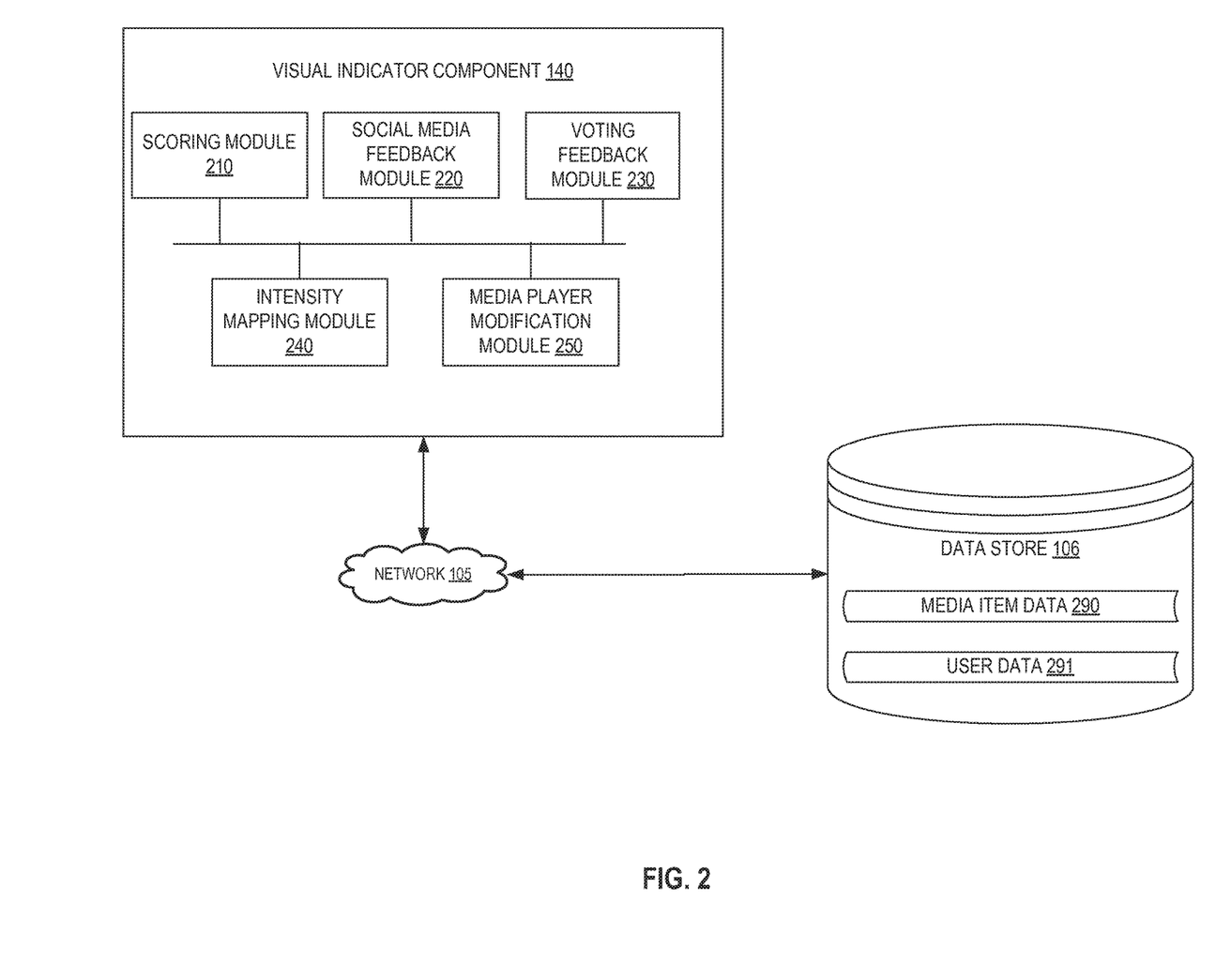
FIG. 2 is a block diagram illustrating a visual indicator component in accordance with one implementation of the disclosure.

FIG. 2 is a block diagram illustrating a visual indicator component 140 in accordance with one implementation of the disclosure. In one implementation, the visual indicator component 140 includes a scoring module 210, a social media feedback module 220, a voting feedback module 230, an intensity mapping module 240, and a media player modification module 250. More or less components may be included in the visual indicator component 140 without loss of generality. For example, two of the modules may be combined into a single module, or one of the modules may be divided into two or more modules. In one implementation, one or more of the modules may reside on different computing devices (e.g., different server computers).

The visual indicator component 140 is communicatively coupled to the data store 106. For example, the visual indicator component 140 may be coupled to the data store 106 via a network (e.g., via network 105 as illustrated in FIG. 1). In another example, the visual indicator component 140 may be coupled directly to a server where the visual indicator component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290 and user data 291.

As discussed above, the visual indicator component 140 applies intensity indicators on a scrub bar of a media player of the content sharing platform to give the user a visual indication of "hot watch" areas of a content item playing back on the media player. A "hot watch" area may include those portions of a content item considered popular, interesting, or otherwise significant to users of the content sharing platform.

In one implementation, when a user accesses and watches a content item that is tagged as "hot watch"-enabled from the content sharing platform, the scoring module 210 divides the content items into multiple segments. In the case of content items that are video, each content item segment may correspond to 'X' number of frames of video. The number of frames, X, in a segment may be determined by the length of the video divided by a desired number of segments to implement the "hot watch" indications (e.g., as determined by an administrator of the content sharing platform or by a content owner that curates (e.g., is in charge of) the content item).

The scrub bar of the media player showing the content item represents the content item segments. The scoring module 210 may then calculate a score for each segment of the content item. In implementations of the disclosure, a score for a content item segment may be based on one or more attributes ("signals"). The signals may include, but are not limited to, editorial input, social media feedback input, voting input, usage input, and other analytical input with respect to the content item. The signals may be utilized as input to one of many various functions that may be utilized to generate the score for a content item segment in implementations of the disclosure.

With regard to the editorial input, an owner of the content item may provide a weight for each timestamp in the content item and thereby statically assign "hot watch" spots to the segments of the content item. In one implementation, this editorial input is stored as a table with the metadata of the content item in media item data 290 of data store 160. The scoring module 210 may ingest this table when the content item is an on-demand content item (e.g., previously recorded and stored at the content sharing platform), or may receive this information as a direct feed from the content owner when the content item is a live event (e.g., streaming simultaneously (or nearly simultaneously) with actual occurrence of the event).

With regard to social media feedback input, the scoring module 210 may cooperate with social media feedback module 220 to determine the segments in the content item that have received the most social media feedback. Social media feedback may include posts, comments, "likes", and other discussions regarding the content item on one or more social networks. The social media feedback module 220 may systematically browse publicly-available social media data to identify and aggregate occurrence of feedback corresponding to moments in the content item. In one example implementation, the social media feedback module 220 may correlate hashtags (e.g., word or phrase prefixed with the symbol '#' as a means of grouping messages) to segments of the content item, and then aggregate occurrences of the hashtag on social networks.

In the case of the content item being a live event, the social media feedback module 220 may identify all social media feedback regarding the live event (e.g., via hashtags or word match) and associate feedback occurring during a timestamp of a segment of the content item with that corresponding segment. The social media feedback module 220 may provide the obtained feedback data to scoring module 210 to incorporate into the scoring assessment.

With respect to voting feedback, the scoring module 210 may cooperate with voting feedback module 230 to process input provided by viewers of the content item indicating whether they considered a segment of the content item as "interesting" or a "best moment", for example. In one implementation, voting feedback module 230 may provide a gadget or other tool as part of the user interface (UI) associated with the playback of the content item, where this gadget or tool provides voting controls to the viewing users to indicate their opinion regarding segments of the content item. Other implementations for aggregating viewer feedback may also be implemented. The voting feedback module 230 may aggregate votes for segments of a content item and provide this data to the scoring module 210 for use in generating the score for the content item segments.

With regard to the usage input, the scoring module 210 may access data detailing viewing activity for segments of a content item and use this data to give weight to segments of the content item that are repeatedly viewed. Media item data 290 may store information regarding locations in the timeline of the content item that viewing users select to view and other viewing activity data, such as when users rewind the content item and to which location in the content item users rewind to. In some implementations, media item data 290 and/or user data 291 may maintain the information relied on for the usage input.

With regard to other analytical input, the scoring module 210 may analyze descriptive metadata of a content item to determine the segments of a content item that may be of interest to viewing users and weight the corresponding segment in terms of score accordingly. For example, in the case of a sporting event, play-by-play data for an event may be analyzed to identify "interesting" moments (e.g., density of scoring plays, lead changes, big plays in the game, etc.) and adjust scores for the corresponding content item segment accordingly. In some implementations, the play-by-play data may be part of the metadata of a content item stored at media item data 290.

Once a score is generated for each content item segment by scoring module 210, the intensity mapping module 240 then correlates the score for each segment of a content item to an associated intensity indicator that is visually represented on the segment's portion of the scrub bar. The higher the score for a segment, the higher the associated intensity indicator on the scrub bar. In one implementation, the intensity indicator may be based on a color scheme, where different colors correlate to different intensity. For example, with a color radar scheme, white may represent a highest intensity, red may represent a lower intensity than white, yellow may represent a lower intensity than red, and so on. In other implementations, the intensity indicator may be represented with a pattern or any other type of differentiator.

In addition, implementations of the disclosure may blend colors at the boundaries of segments in order to provide a smooth or gradual transition between different segments having different intensity indicators on the scrub bar. This also provides a cleaner and smoother appearance to the scrub bar and indicates a build up from low intensity segments to high intensity segments, and vice versa.

The media player modification module 250 may then retrofit the media player to display the intensity indicators associated with a content item in the scrub bar of the media player. In some implementations, the intensity indicators may be provided as a subclass of the scrub bar functionality. When the content item is tagged as "hot-watch"-enabled, then the media player modification module 250 provides the extra layer of intensity indicator functionality when the media player is downloaded from the content sharing platform for viewing of the content item. In addition, as the signals for a content item may change over time, implementations of the disclosure can update the scores for segments of the content item, and associated intensity indicators, over time as the signals change.

In some implementations, the providing visual hot watch spots in content item playback on a content sharing platform described above is performed in the context of content item streaming to a mobile device that is executing a content sharing platform application specifically designed for playback of the content item.

Figure 3:
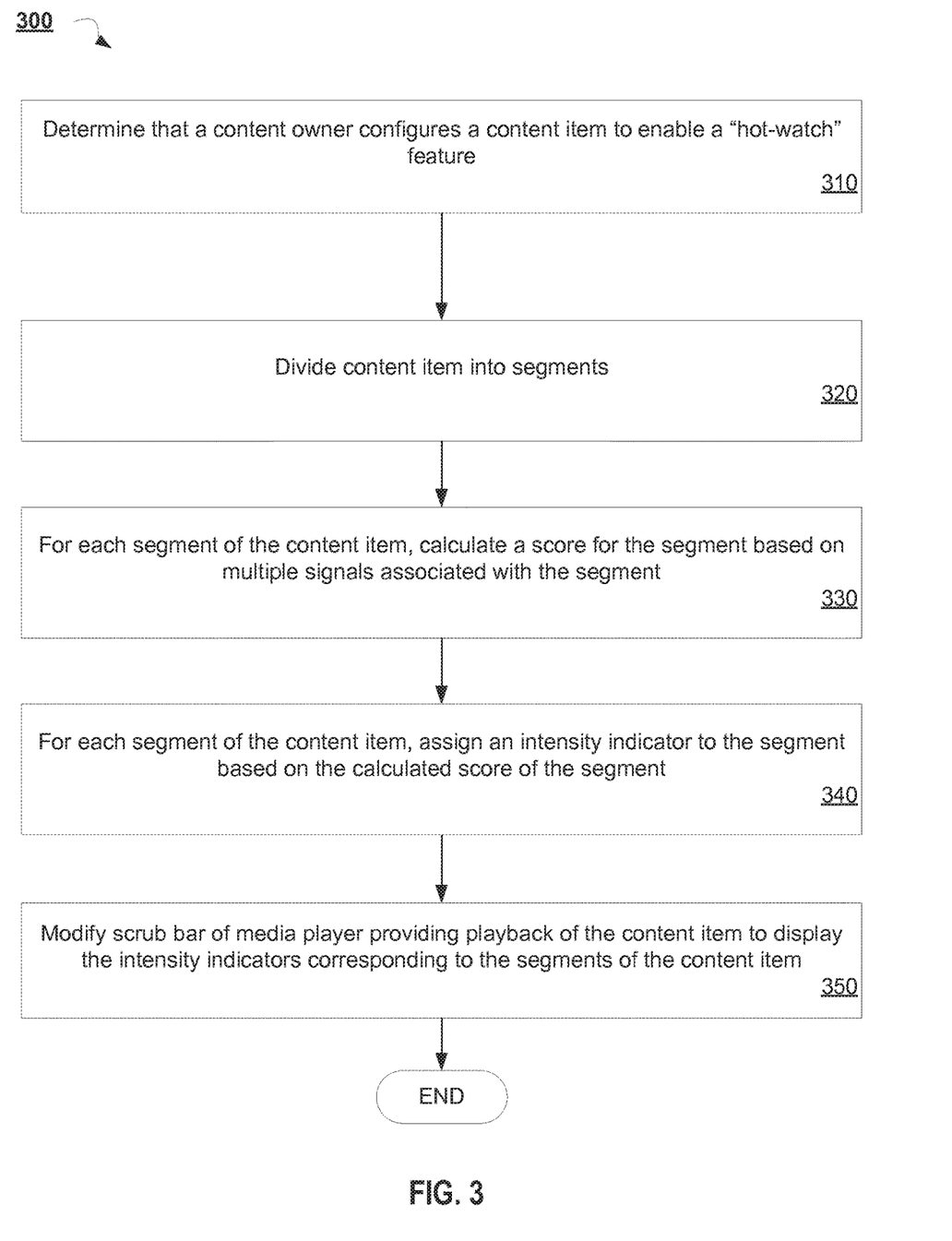
FIG. 3 is a flow diagram illustrating a method for providing visual hot watch spots in content item playback on a content sharing platform, according to some implementations of the disclosure.

FIG. 3 is a flow diagram illustrating a method 300 for providing visual "hot watch" spots in content item playback by a content sharing platform, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by visual indicator component 140 as shown in FIGS. 1 and 2.

Referring to FIG. 3, at block 310, method 300 begins at block 310 when the visual indicator component determines that a content owner configures a content item to enable a "hot watch" feature for the content item. Then, at block 320, the content item is divided into segments. In the case of a content item that is a video, each content item segment may correspond to 'X' number of frames of video. The number of frames in a segment may be determined by the length of the video divided by a desired number of segments to implement the "hot watch" indications.

At block 330, for each segment of the content item, a score is calculated for the segment based on multiple signals associated with the segment. As discussed above, the signals may include, but are not limited to, editorial input, social media feedback input, voting input, usage input, and other analytical input with respect to the content item. The signals may be utilized as input to one of various functions that may be utilized to generate the score for a content item segment in implementations of the disclosure.

Subsequently, at block 340, for each segment of the content item, an intensity indicator is assigned to the segment. In one implementation, the assigned intensity indicator corresponds to the calculated score for the segment, where the higher the score, the higher the intensity indicator. The intensity indicators may be colors, similar to color schemes used in a heat map or a radar color scheme.

Lastly, at block 350, for each segment of the content item, a scrub bar of a media player providing playback of the content item is modified to display the intensity indicators corresponding to the segments of the content item. For example, the portion of the scrub bar corresponding to a particular segment is modified to display the color of the intensity indicator assigned to that segment. In some implementations, when there are different colors between two consecutive segments in the scrub bar, the colors at the boundaries of the segments may be blended together to create a smoother appearance to the transition between the segments.

Figure 4:
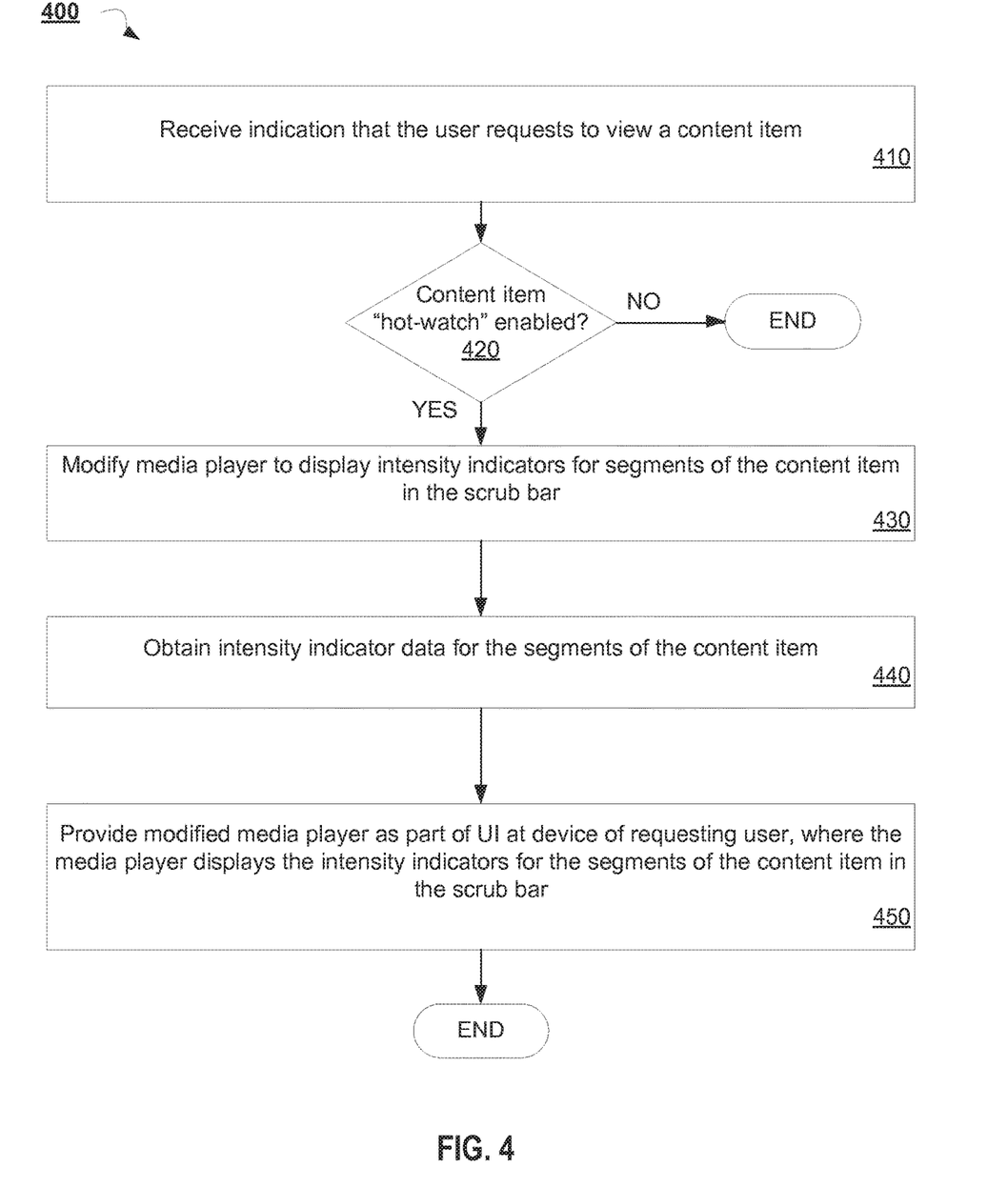
FIG. 4 is a flow diagram illustrating another method for providing visual hot watch spots in content item playback on a content sharing platform, according to some implementations of the disclosure.

FIG. 4 is a flow diagram illustrating another method 400 for providing visual "hot watch" spots in content item playback by a content sharing platform, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by visual indicator component 140, as shown in FIGS. 1 and 2.

Referring to FIG. 4, at block 410, method 400 begins at block 410 when an indication is received that a user is requesting to view a content item. At decision block 420, it is determined whether the requested content item is "hot-watch" enabled. In some embodiments, the content item may be tagged or flagged to indicate whether the "hot-watch" feature is enabled for the content item. If the content item is not indicated as "hot watch"-enabled, the method 400 ends. On the other hand, if the content item is indicated at "hot watch"-enabled, then method 400 continues to block 430.

At block 430, a media player to provide playback of the content item is modified to display intensity indicators for segments of the content item in the scrub bar. In one implementation, the intensity indicators may be provided as a subclass of the scrub bar functionality. Then, at block 440, intensity indicator data for the segments of the content item is obtained. In one implementation, the intensity indicator data may be generated by method 300 described above with respect to FIG. 3. The intensity indicator data may be a color, which corresponds to a score calculated for the segment based on one or more signals associated with the segment, such editorial input, social media feedback input, voting input, usage input, and other analytical input with respect to the content item.

At block 450, the modified media player is provided as part of a UI at a device of the requesting user. The modified media player may then display the intensity indicators in the scrub bar according to the obtained intensity indicator data for the segments of the content item. In one implementation, a portion of the scrub bar corresponding to a particular segment displays the color of the intensity indicator assigned to that segment. In some implementations, when there are different colors between two consecutive segments in the scrub bar, the colors at the boundaries of the segments may be blended together to create a smoother appearance to the transition between the segments.

Figure 5:
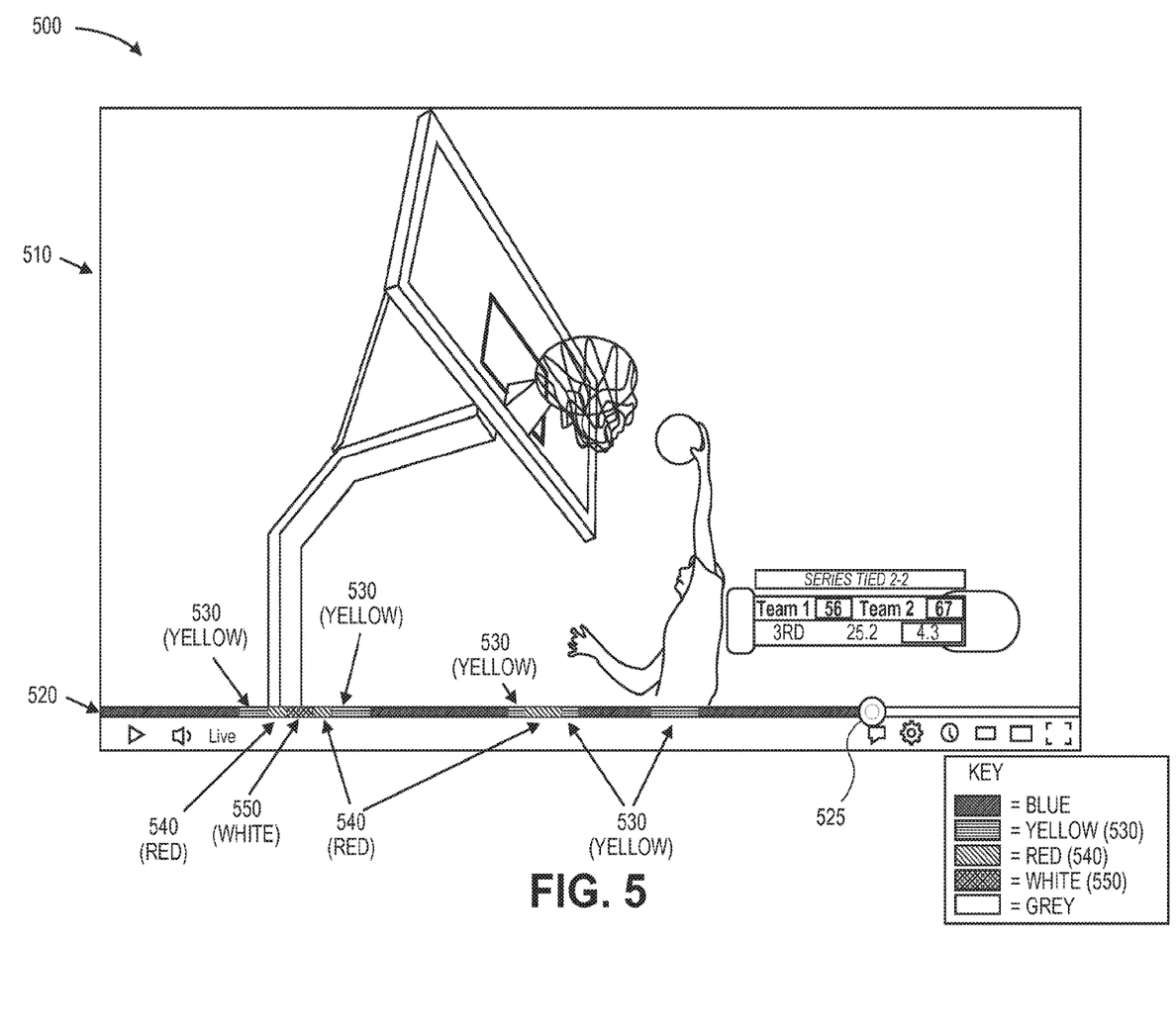
FIG. 5 is an example screenshot illustrating a visual "hot watch"-enabled UI provided to a user viewing a content item via a media player at a client device.
Figure 6:
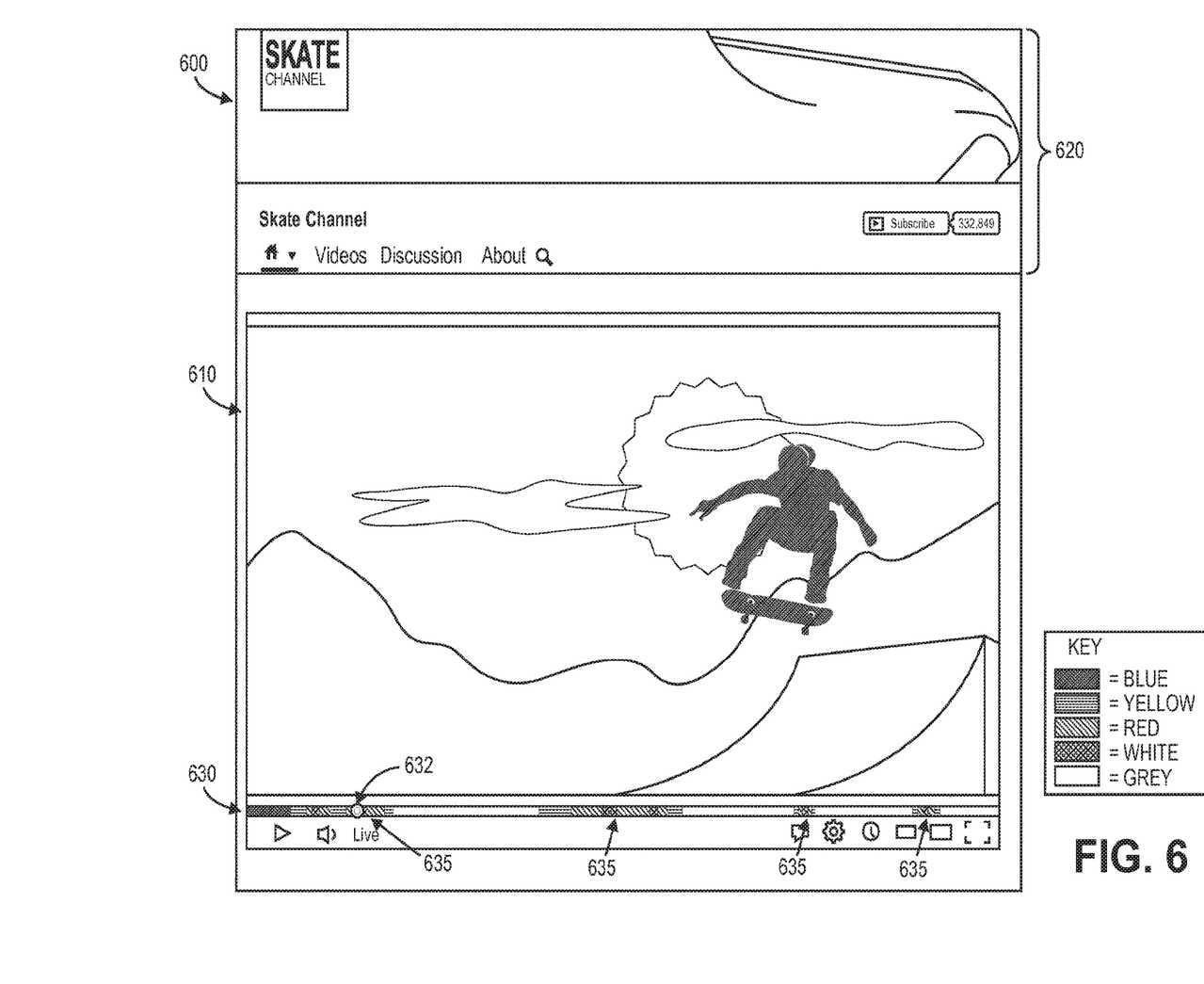
FIG. 6 is an example screenshot illustrating another visual "hot watch"-enabled UI provided to a user viewing a content item via a media player at a client device.

FIGS. 5 and 6 are example screenshots illustrating UIs for providing visual hot watch spots in content item playback. FIG. 5 illustrates an example screenshot of a visual "hot watch"-enabled UI 500 provided to a user viewing a content item via a media player 510 at a client device. The visual "hot watch"-enabled UI 500 includes the media player 510 playing back the content item and a scrub bar 520 as part of the media player 510. The scrub bar 520 is a timeline of the content item. In one implementation, the scrub bar 520 includes a current position indicator 520 informing the user of his or her current position in the content item timeline during playback of the content item.

The scrub bar 520 may further include "hot watch" spots shown in different colors, such as yellow 530, red 540, and white 550, than default colors (e.g., blue for portions of the content item previous to the current position indicator 520 and gray for upcoming portions of the content item with respect to the current position indicator 520) of the scrub bar 520. Other colors and/or other visual indicators (e.g., different shades, different textual descriptions, different geometric shapes, lines or curves in a graph, etc.) than those described with respect to UI 500 may also be utilized in implementations of the disclosure.

In one implementation, the "hot watch" spots indicate areas of particular interest to viewers of the content item. As discussed above, the "hot watch" spots may be determined based on a variety of signals, such as editorial input, social media feedback input, voting input, usage input, and other analytical input with respect to the content item. In one implementation, colors at a segment boundary on the scrub bar may be blended together to create a smoother appearance to the transitions between segments having different interest levels in terms of "hot watch" spots.

In one implementation, visual "hot watch"-enabled UI 500 is displaying a live event. As such, the portions of the content item subsequent to the current position indicator 525 do not include any "hot watch" indicators, as these segments of the content item have not occurred yet.

FIG. 6 illustrates an example screenshot of another visual "hot watch"-enabled UI 600 provided to a user viewing a content item via a media player 610 at a client device. The visual "hot watch"-enabled UI 600 may be a channel page of content sharing platform, where the channel page includes a header 620 displaying information describing the channel and the media player 610 playing back a content item. The media player 610 includes a scrub bar 630 providing a timeline of the content item. In one implementation, the scrub bar 630 includes a current position indicator 632 informing the user of his or her current position in the content item timeline during playback of the content item.

The scrub bar 630 may further include "hot watch" spots 635 shown in different colors, such as yellow, red, and white, than default colors (e.g., blue for portions of the content item previous to the current position indicator 632 and gray for upcoming portions of the content item with respect to the current position indicator 632) of the scrub bar 630. Other colors and/or other visual indicators than those described with respect to UI 600 may also be utilized in implementations of the disclosure.

As discussed above, the "hot watch" spots indicate areas of particular interest to viewers of the content item and may be determined based on a variety of signals, such as editorial input, social media feedback input, voting input, usage input, and other analytical input with respect to the content item. In one implementation, colors at a segment boundary on the scrub bar may be blended together to create a smoother appearance to the transitions between segments having different interest levels in terms of "hot watch" spots. In one implementation, visual "hot watch"-enabled UI 600 is displaying a video on demand event (e.g., already recorded/not live). As such, the portions of the content item previous to and subsequent to the current position indicator 632 may include "hot watch" indicators 635.

Figure 7:
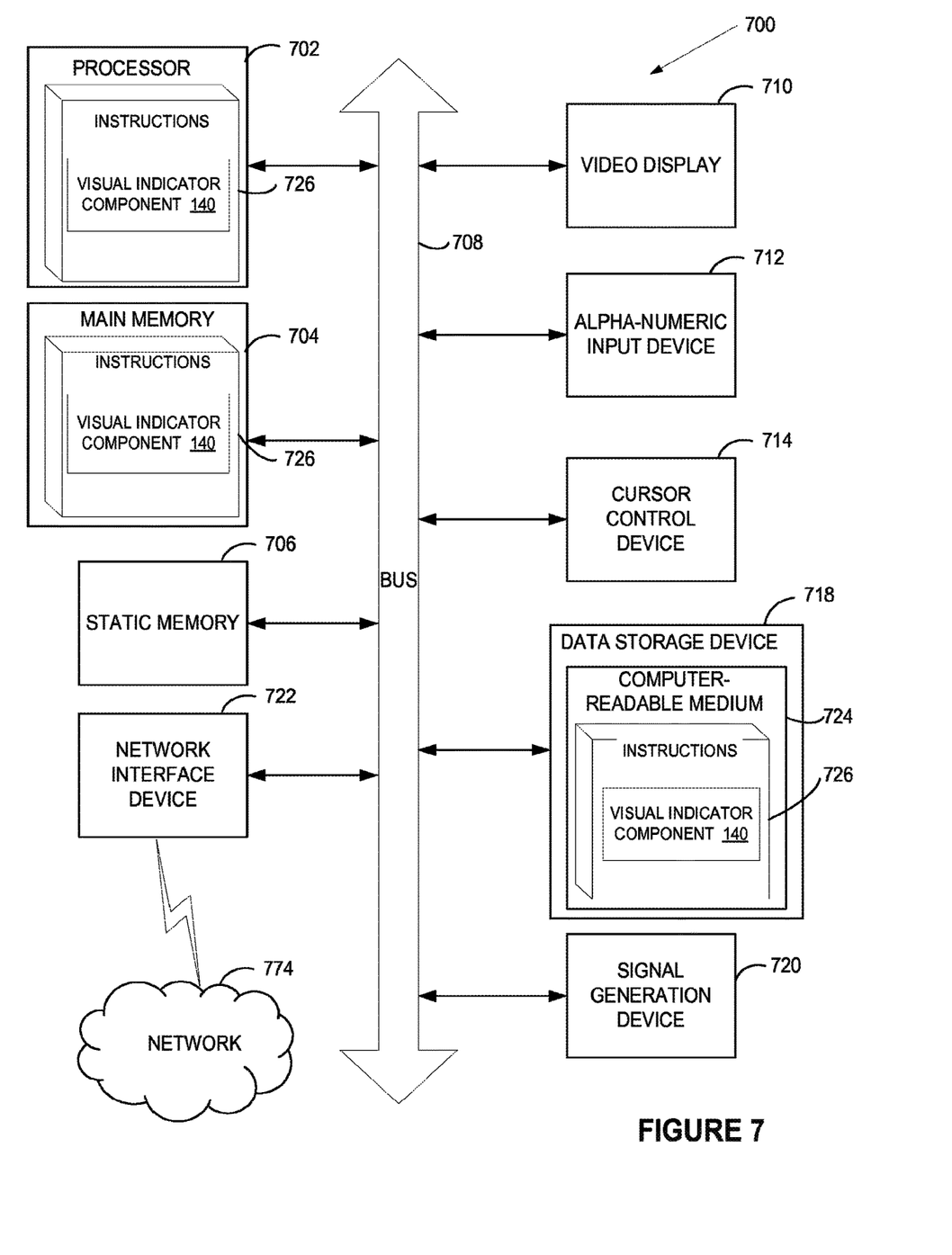
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for a visual indicator component 140, which may correspond, respectively, to their identically-named counterparts described with respect to FIGS. 1 and 2, and/or a software library containing methods that call a visual indicator component for providing visual hot watch spots in content item playback on a content sharing platform. While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   obtaining viewer feedback comprising input associated with a time interval segment of multiple time interval segments of a content item of a content sharing platform, the viewer feedback received from user devices of users of the content sharing platform, the viewer feedback received via user feedback controls comprised in a user interface (UI) providing playback of the content item and comprising user indications of approval of the time interval segment, wherein the approval comprises a like of the time interval segment;
   determining a score for the time interval segment based on the viewer feedback;
   modifying a portion of a scrub bar user interface element of a media player presenting the content item, the modifying comprising:
      providing a visual indication of the score for the time interval segment corresponding to the portion of the scrub bar user interface element, the visual indication associated with a color schema where each grade of the color schema correlates to a different score; and
      providing a gradual transition between colors at one or more boundaries of the time interval segment; and
   updating the score and modifying the portion responsive to new viewer feedback received for the time interval segment during playback of the content item.

2. The method of claim 1, wherein the portion corresponding to the time interval segment.

3. The method of claim 1, wherein each time interval segment of the content item comprises a predetermined number of video frames of the content item.

4. The method of claim 3, wherein the number of video frames in each time interval segment is determined by a duration of the content item divided by a predetermined number of time interval segments.

5. The method of claim 1, wherein time interval segments of the content item having a score above a highest score threshold are shown as white on the scrub bar user interface element and the time interval segments having a score below a lowest score threshold are shown with no color on the scrub bar user interface element.

6. The method of claim 1, wherein determining the score is further based on signals comprising at least one of a frequency of discussion regarding content of the time interval segment on one or more social networks, or a viewing weight assigned to the time interval segment, an editorial weight assigned to the time interval segment, wherein the viewing weight corresponds to views by the users of the content sharing platform of the time interval segment, and wherein the editorial weight comprises an owner-assigned weight to apply to the time interval segment.

7. The method of claim 1, wherein a user of the content sharing platform that curates the content item determines a number of time interval segments for the content item.

8. The method of claim 1, wherein the determining, the modifying, and the updating are performed during real-time playback of the content item when the content item is a live event.

9. An apparatus comprising:
a memory; and
a processing device communicably coupled to the memory, the processing device to execute instructions to:
   obtain viewer feedback comprising input associated with a time interval segment of multiple time interval segments of a content item of a content sharing platform, the viewer feedback received from user devices of users of the content sharing platform, the viewer feedback received via user feedback controls comprised in a user interface (UI) providing playback of the content item and comprising user indications of approval of the time interval segment, wherein the approval comprises a like of the time interval segment;
   determine a score for the time interval segment based on the viewer feedback;
   modify a portion of a scrub bar user interface element of a media player presenting the content item, the instructions to modify further comprising instructions to:
      provide a visual indication of the score for the time interval segment corresponding to the portion of the scrub bar user interface element, the visual indication associated with a color schema where each grade of the color schema correlates to a different score; and
      provide a gradual transition between colors at one or more boundaries of the time interval segment; and
   update the score and modify the portion responsive to new viewer feedback received for the time interval segment during playback of the content item.

10. The apparatus of claim 9, wherein the portion corresponding to the time interval segment.

11. The apparatus of claim 9, wherein each time interval segment of the content item comprises a predetermined number of video frames, and wherein the number of video frames in the time interval segment is determined by a duration of the content item divided by a predetermined number of time interval segments.

12. The apparatus of claim 9, wherein a user of the content sharing platform that curates the content item determines a number of time interval segments for the content item.

13. The apparatus of claim 9, wherein time interval segments of the content item having a score above a highest score threshold are shown as white on the scrub bar user interface element and the time interval segments having a score below a lowest score threshold are shown with no color on the scrub bar user interface element.

14. The apparatus of claim 9, wherein processing device to execute instructions to determine the score is further based on signals comprising at least one of a frequency of discussion regarding content of the time interval segment on one or more social networks, or a viewing weight assigned to the time interval segment, an editorial weight assigned to the time interval segment, wherein the viewing weight corresponds to views by the users of the content sharing platform of the time interval segment, and wherein the editorial weight comprises an owner-assigned weight to apply to the time interval segment.

15. A non-transitory machine-readable storage medium storing instructions which, when executed, cause a processing device to perform operations comprising:
   obtaining, by the processing device, viewer feedback comprising input associated with a time interval segment of multiple time interval segments of a content item of a content sharing platform, the viewer feedback received from user devices of users of the content sharing platform, the viewer feedback received via user feedback controls comprised in a user interface (UI) providing playback of the content item and comprising user indications of approval of the time interval segment, wherein the approval comprises a like of the time interval segment;
   determining a score for the time interval segment based on the viewer feedback;
   modifying a portion of a scrub bar user interface element of a media player presenting the content item, the modifying comprising:
      providing a visual indication of the score for the time interval segment corresponding to the portion of the scrub bar user interface element, the visual indication associated with a color schema where each grade of the color schema correlates to a different score; and
      providing a gradual transition between colors at one or more boundaries of the time interval segment; and
   updating the score and modifying the portion responsive to new viewer feedback received for the time interval segment during playback of the content item.

16. The non-transitory machine-readable storage medium of claim 15, wherein each time interval segment of the content item comprises a predetermined number of video frames, and wherein the number of video frames in each time interval segment is determined by a duration of the content item divided by a predetermined number of time interval segments.

17. The non-transitory machine-readable storage medium of claim 15, wherein time interval segments of the content item having a score above a highest score threshold are shown as white on the scrub bar user interface element and the time interval segments having a score below a lowest score threshold are shown with no color on the scrub bar user interface element.

18. The non-transitory machine-readable storage medium of claim 15, wherein determining the score is further based on signals comprising at least one of a frequency of discussion regarding content of the time interval segment on one or more social networks, or a viewing weight assigned to the time interval segment, an editorial weight assigned to the time interval segment, wherein the viewing weight corresponds to views by the users of the content sharing platform of the time interval segment, and wherein the editorial weight comprises an owner-assigned weight to apply to the time interval segment.

19. The non-transitory machine-readable storage medium of claim 15, wherein the portion corresponding to the time interval segment.

20. The non-transitory machine-readable storage medium of claim 15, wherein a user of the content sharing platform that curates the content item determines a number of time interval segments for the content item.

* * * * *